United States Patent [19]

Miura et al.

[11] Patent Number: 4,921,959
[45] Date of Patent: May 1, 1990

[54] ANTHRAQUINONE COMPOUNDS AND POLARIZING FILM CONTAINING THE SAME

[75] Inventors: Konoe Miura, Yokohama; Tetsuo Ozawa, Hadano; Seigo Okumura, Machida; Shinji Kubo, Kitakyushu, all of Japan

[73] Assignee: Mitsubishi Chemical Industries Limited, Tokyo, Japan

[21] Appl. No.: 344,204

[22] Filed: Apr. 27, 1989

Related U.S. Application Data

[62] Division of Ser. No. 143,366, Jan. 12, 1988, Pat. No. 4,841,057.

[30] Foreign Application Priority Data

Jan. 13, 1987 [JP] Japan .................. 62-5569
Feb. 10, 1987 [JP] Japan .................. 62-28696

[51] Int. Cl.$^5$ .................. C07C 143/36; C07D 413/00; C07D 265/30
[52] U.S. Cl. .................. 546/152; 546/173; 546/175; 546/177; 546/265; 546/281; 546/285; 552/218; 552/234; 552/235
[58] Field of Search .................. 552/234, 218, 235; 546/152, 173, 175, 177, 265, 285, 281

[56] References Cited

U.S. PATENT DOCUMENTS

| | | | |
|---|---|---|---|
| 4,136,100 | 1/1979 | Epple | 260/377 |
| 4,528,113 | 7/1985 | Imazeki et al. | 260/360 |
| 4,596,666 | 6/1986 | Blunck et al. | 260/377 |
| 4,689,171 | 8/1987 | Blunck et al. | 260/377 |
| 4,755,012 | 7/1988 | Kojima | 252/299.1 |

Primary Examiner—Richard L. Raymond
Assistant Examiner—Raymond Covington
Attorney, Agent, or Firm—Jordan B. Bierman

[57] ABSTRACT

An anthraquinone compound represented by formula:

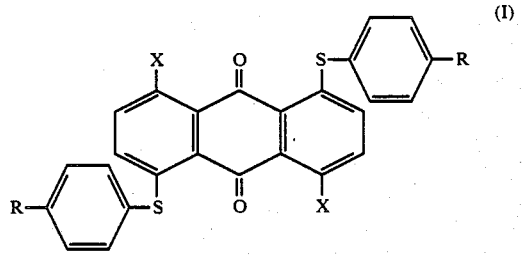

(I)

wherein R and X are as defined in the specification, and a polarizing film containing the same. The anthraquinone compound exhibits satisfactory compatibility with organic polymers and high dichroism, and the polarizing films have excellent performance characteristics.

3 Claims, No Drawings

ANTHRAQUINONE COMPOUNDS AND POLARIZING FILM CONTAINING THE SAME

PRIOR APPLICATION

This application is a divisional of U.S. patent application Ser. No. 143,366 filed January 12, 1988 now U.S. Pat. No. 4,841,057, which claims the priority of Japanese Applications 5569/87 and 28696/87, filed January 13, 1987 and February 10, 1987, respectively.

FIELD OF THE INVENTION

This invention relates to a novel anthraquinone compound and a polarizing film containing the same.

BACKGROUND OF THE INVENTION

Conventionally known polarizing films include polyvinyl alcohol (PVA) base films dyed with iodine or a dichroic dye. Since these polarizing films, though exhibiting excellent polarizing performance, are inferior in heat resistance, moisture resistance, and the like, an acetyl cellulose film or the like film has been laminated thereon for practical use. Nevertheless, the laminated polarizing films still have insufficient moisture resistance depending on use.

Polarizing films comprising, as a film base material, a hydrophobic polymer other than PVA have been proposed, in which a vinyl halide polymer, e.g., polyvinyl chloride (PVC), polyvinylidene chloride (PVDC), etc., is dehydrohalogenated to form a polyene structure. However, they have not yet become so popular not only because they are also unsatisfactory in stability to heat, light or oxygen but because a free choice in hue is not allowed.

Further, polyamide base polarizing films have also been proposed as disclosed in Japanese Patent Publication No. 3944/74 and Japanese Patent Application (OPI) No. 45153/79 (the term "OPI" as used herein means "unexamined published Japanese patent application"). Although the polyamide-dye type polarizing films are superior to PVA-iodine polarizing films, PVA-dichroic dye polarizing films, or polyene type polarizing films in terms of heat resistance, moisture resistance, dynamic strength, and the like, they are inferior in polarizing performance to these three types of polarizing films.

SUMMARY OF THE INVENTION

One object of this invention is to provide a novel anthraquinone compound having satisfactory compatibility with an organic polymer and high dichroism.

Another object of this invention is to provide a polarizing film having excellent characteristics, such as polarizing performance, heat resistance, moisture resistance, weather resistance, transparency, and the like.

The present invention relates to an anthraquinone compound represented by formula (I) shown below and a polarizing film containing the same.

Formula (I) is represented by

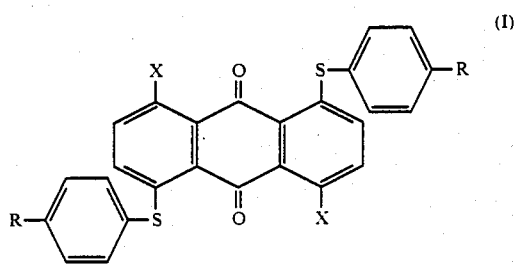

wherein two R, which may be the same or different, each represents a hydrogen atom, —NHCOR$^1$, —CONHR$^1$, or

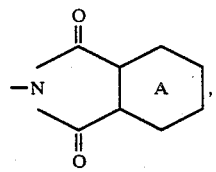

wherein R$^1$ represents an alkyl group, a substituted or unsubstituted aryl group, or a substituted or unsubstituted cycloalkyl group; ring A represents a substituted or unsubstituted aromatic or aliphatic ring; and two X, which may be the same or different, each represents a hydrogen atom or an amino group, provided that X and R are not simultaneously a hydrogen atom.

DETAILED DESCRIPTION OF THE INVENTION

In formula (I), the alkyl group as represented by R$^1$ preferably includes a straight chain or branched alkyl group having from 1 to 8 carbon atoms. The substituted or unsubstituted aryl group as represented by R$^1$ includes a phenyl group; a phenyl group substituted with an alkyl group, and preferably an alkyl group having from 1 to 8 carbon atoms; a phenyl group substituted with an alkoxy group, and preferably an alkoxy group having from 1 to 8 carbon atoms; a biphenyl group, a heterocyclic group, e.g., a pyridinyl group, etc.; a naphthyl group, an anthraquinon-2-yl group; a phenyl group substituted with an acylamino group, such as an alkylcarbonylamino group (e.g., an acetylamino group, a butyrylamino group, a caprylamino group, etc.), and an arylcarbonylamino group (e.g., a benzoylamino group, a p-butylbenzoylamino group, a p-phenylbenzoylamino group, etc.); a 4-cyclohexylphenyl group; a cyclohexylphenyl group substituted with a trans-4-alkyl group, and preferably an alkyl group having from 1 to 8 carbon atoms; and the like. The substituted or unsubstituted cycloalkyl group as represented by R$^1$ includes a cyclohexyl group, a 4-alkylcyclohexyl group, and preferably a trans-4-alkylcyclohexyl group substituted with an alkyl group having from 1 to 8 carbon atoms, a 4-cyclohexylcyclohexyl group, etc.

The group of

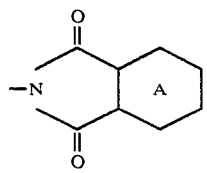

includes aromatic or aliphatic cyclic imido groups, such as

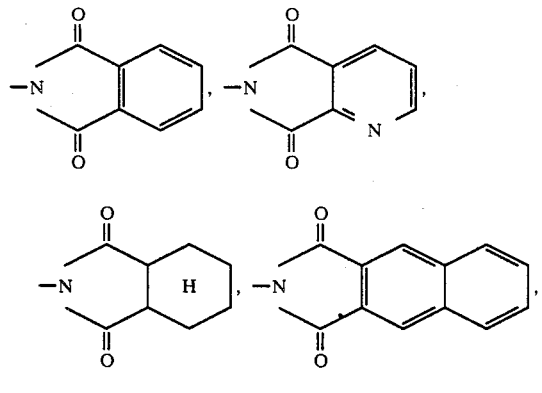

wherein Z represents a halogen atom (e.g., a chlorine atom, a bromine atom, etc.); and n represents an integer of from 1 to 4,

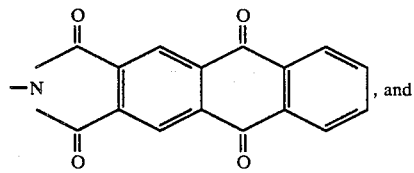

wherein $R^2$ represents —$COOR^3$, wherein $R^3$ represents an alkyl group, and preferably an alkyl group having from 1 to 8 carbon atoms, —$CONHR^3$,

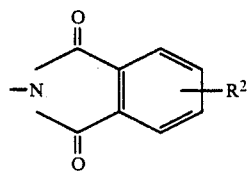

wherein $R^4$ represents a hydrogen atom, an alkoxy group having from 1 to 8 carbon atoms or $R^3$,

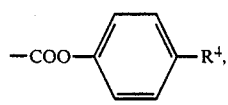

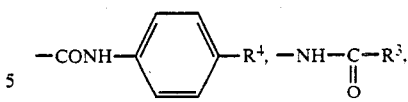

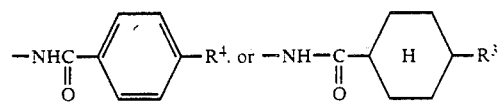

The anthraquinone compounds represented by formula (I) can be prepared, for example, by reacting an anthraquinone compound represented by formula (II)

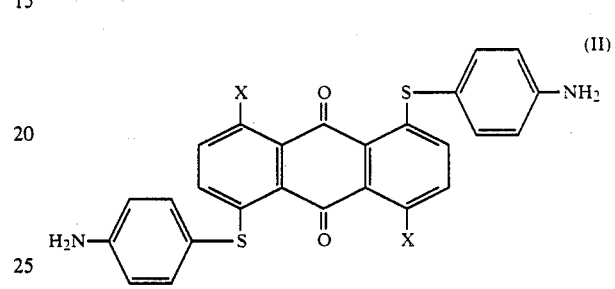

wherein X is as defined above, with a compound represented by formula (III)

$$Y-CO-R^1 \qquad (III)$$

wherein $R^1$ is as defined above; and Y represents a halogen atom (e.g., a chlorine atom, a bromine atom, etc.), or a compound represented by formula (IV)

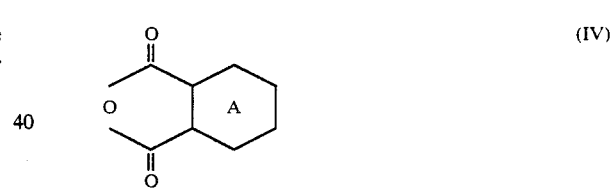

wherein ring A is as defined above, in a solvent, such as an aromatic solvent (e.g., mono-, di-, or trichlorobenzene, nitrobenzene, etc.), an amide solvent (e.g., N,N-dimethylformamide, N-methylacetamide, N-methylpyrrolidone, etc.), and the like, at a temperature, for example, of from 50° to 200° C.

The reaction between the compound of formula (II) and the compound of formula (III) may be carried out in the presence of an acid scavenger, such as alkylamines (e.g., triethylamine, tributylamine, etc.), nitrogen-containing compounds (e.g., pyridine, picoline, quinoline, quinaldine, etc.), and inorganic bases (e.g., potassium carbonate, sodium carbonate, sodium hydrogencarbonate, potassium hydroxide, etc.).

Alternatively the anthraquinone compounds represented by formula (I) can be prepared, for example, by reacting 1,5-dichloroanthraquinone with a compound represented by formula (V)

wherein R is as defined in formula (I), in an amide solvent such as N,N-dimethylformamide, N-methylacetamide, N-methylpyrolidone, etc. in the presence of the aforementioned acid scavenger at a temperature of from 50° to 200° C.

The organic polymers which can be used as a film base material for the polarizing films of the present invention include polyester, polycarbonate, polyethersulfone, polyimide, polyamide, vinyl halide polymers, vinylidene halide polymers, polyvinyl alcohol resins, ethylene-vinyl acetate copolymers, cellulose resins, polyvinyl butyral resins, and liquid crystal polymers. The liquid crystal polymers include polyethylene terephthalate-p-hydroxybenzoic acid copolymer polyesters.

Of these polymers, preferred are those having excellent heat resistance and moisture resistance, such as polyesters, e.g., polyethylene terephthalate, polyethylene naphthalate, etc., and a polyethylene terephthalate-p-hydroxybenzoic acid copolymer polyester liquid polymer.

The polarizing film according to the present invention can be produced by adding to the above-described organic polymer from 0.01 to 10% by weight, and preferably from 0.05 to 5% by weight, of the anthraquinone compound of formula (I), i.e., a dichroic dye.

The anthraquinone compounds according to the present invention may be used either individually or in combinations of two or more thereof. If desired, they may also be combined with other dichroic dyes, dyes having no dichroism, or additives, such as ultraviolet absorbing agents, antioxidants, and the like.

The method for producing the polarizing film is not particularly limited. In general, a composition comprising the film base polymer, the anthraquinone compound, and, if any, various additives is homogeneously melted and molded into a film or a sheet. The film or sheet is uniaxially stretched from 3 to 12 times at a temperature of from 20° to 200° C. and then heat treated at a temperature of from 100° to 250° C. for a period of from 1 second to 30 minutes to obtain a film having a thickness, for example, of from 30 to 200 μm. If desired, the film may also be stretched in the direction perpendicular to the major stretching direction.

The thus produced polarizing film can be used as such or, if desired, may be subjected to various finishing treatments depending on the final use. For example, a protective layer comprising a triacetate, acrylic, or urethane polymer, etc. may be laminated thereon, or a transparent conductive film comprising an indium-tin oxide, etc. may be formed on the surface of the polarizing film by vacuum deposition, sputtering or coating.

The present invention is now illustrated in greater detail with reference to Examples, but it should be understood that the present invention is not deemed to be limited thereto.

In these examples, the coefficient of dye orientation (Fdye) of the anthraquinone compound that is a dichroic dye was calculated by equation (1):

$$F_{dye} = (D-1)/(D+2) \quad (1)$$

wherein D is an absorption dichroism ratio of a dichroic dye-containing film, which can be obtained from equation (2):

$$D = \text{Log}(I_0/I_{II})/\text{Log}(I_0/I_I) \quad (2)$$

wherein $I_0$ is a transmittance of a non-dyed film prepared under the same stretching conditions and the same treating conditions, and $I_I$ and $I_{II}$ each is a transmittance of the non-dyed film when a polarizing plane of an incident light ray is vertical to or parallel with the stretching axis, respectively. The Fdye value represents a degree of orientation of the dichroic dye. The greater the Fdye value, the greater the polarizing performance of the polarizing film.

EXAMPLE 1

One gram of an anthraquinone compound of formula:

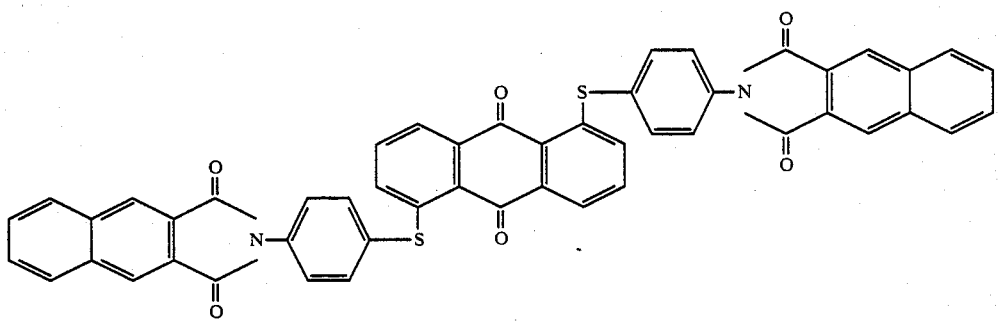

was melt-mixed with 1 Kg of a polyethylene naphthalate resin at 300° C., and the mixture was moled into a film colored in distinct yellow.

The film was uniaxially stretched 5 times at 140° C. by means of a stretching machine manufactured by T. M. Long to obtain a yellow polarizing film having a thickness of 100 μm. The resulting polarizing film had a maximum absorption wavelength of 448 nm and a Fdye value of 0.84.

The anthraquinone compound used in this example was synthesized as follows.

A mixture consisting of 1 g of 1,5-bis(4'-aminophenylthio)anthraquinone, 0.87 g of naphthalene-2,3-dicarboxylic acid anhydride, and 50 ml of N,N-dimethylformamide was heated at 150° C. for 4 hours while stirring. After cooling, the precipitate formed was collected by filtration, washed with methanol, and dried to obtain 0.97 g of the desired anthraquinone compound having a melting point of 300° C. or higher.

EXAMPLE 2

One gram of an anthraquinone compound of formula:

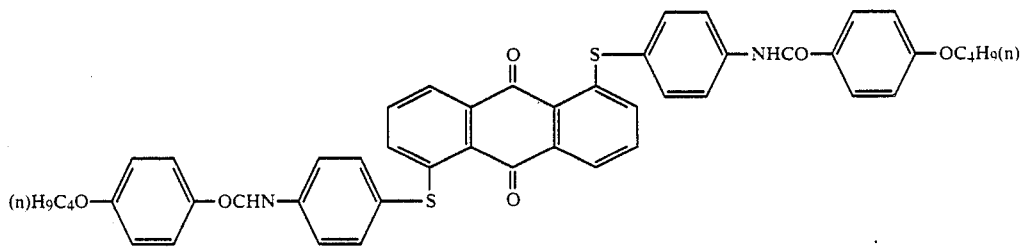

was melt-mixed with 1 Kg of a polyethylene naphthalate resin, and the mixture was molded into a film colored in distinct yellow.

The film was stretched in the same manner as in Example 1 to obtain a 100 μm thick yellow polarizing film. The resulting polarizing film had a maximum absorption wavelength of 455 nm and a Fdye value of 0.85.

The anthraquinone compound used in this example was synthesized as follows.

One gram of 1,5-bis(4'-aminophenylthio)anthraquinone was dissolved in 100 ml of monochlorobenzene at 130° C., and to the solution was added 4-n-butoxybenzoyl chloride prepared by reacting 1.02 g of 4-n-butoxybenzoic acid and 0.77 ml of thionyl chloride. To the mixture was further added 1.7 ml of pyridine, and the mixture was allowed to react at 130° C. for 3 hours. After cooling, 100 ml of methanol was added to the reaction mixture, and the precipitated crystals were collected by filtration to obtain 0.74 g of the desired compound having a melting point of 300° C. or higher.

EXAMPLES 3 to 34

Anthraquinone compounds shown in Table 1 below were synthesized in accordance with the process described in Example 1 or 2. A polarizing film was produced in the same manner as in Example 1, except for using each of these anthraquinone compounds. The maximum absorption wavelength and Fdye value of the resulting polarizing film are also shown in Table 1.

TABLE 1

| Example No. | $R^a$ | $R^b$ | Maximum Absorption Wavelength (nm) | Fdye |
|---|---|---|---|---|
| 1 | (naphthalene-fused imide group) | the same as $R^a$ | 448 | 0.84 |
| 2 | —NHCO—C₆H₄—OC₄H₉(n) | the same as $R^a$ | 455 | 0.85 |
| 3 | —NHCOC₅H₁₁(n) | the same as $R^a$ | 450 | 0.82 |
| 4 | —NHCOC₃H₇(n) | —NHCOCH₃ | 450 | 0.82 |
| 5 | —NHCO—C₆H₅ | the same as $R^a$ | 455 | 0.83 |
| 6 | —NHCO—C₆H₄—C₄H₉(n) | —NHCO—C₆H₅ | 455 | 0.85 |

TABLE 1-continued

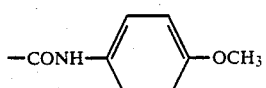

| Example No. | $R^a$ | $R^b$ | Maximum Absorption Wavelength (nm) | Fdye |
|---|---|---|---|---|
| 7 | —CONH—⟨C6H4⟩—OCH3 | the same as $R^a$ | 457 | 0.84 |
| 8 | —NHCO—⟨C6H4⟩—⟨C6H5⟩ | the same as $R^a$ | 455 | 0.83 |
| 9 | —CONH—⟨pyridyl-N⟩ | the same as $R^a$ | 457 | 0.84 |
| 10 | —NHCO—⟨naphthyl⟩ | the same as $R^a$ | 455 | 0.84 |
| 11 | —NHCO—⟨anthraquinonyl⟩ | the same as $R^a$ | 455 | 0.82 |
| 12 | —NHCO—⟨C6H4⟩—NHCOCH3 | the same as $R^a$ | 454 | 0.84 |
| 13 | —CONH—⟨C6H4⟩—NHCOC5H11(n) | the same as $R^a$ | 454 | 0.85 |
| 14 | —NHCO—⟨C6H4⟩—NHCO—⟨C6H5⟩ | the same as $R^a$ | 454 | 0.84 |
| 15 | —NHCO—⟨C6H4⟩—NHCO—⟨C6H4⟩—C4H9(n) | the same as $R^a$ | 455 | 0.85 |
| 16 | —NHCO—⟨C6H4⟩—NHCO—⟨C6H4⟩—⟨C6H5⟩ | the same as $R^a$ | 455 | 0.85 |

TABLE 1-continued

| Example No. | $R^a$ | $R^b$ | Maximum Absorption Wavelength (nm) | Fdye |
|---|---|---|---|---|
| 17 | 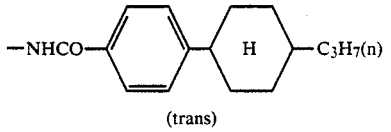 —CONH—⟨phenyl⟩—⟨cyclohexyl-H⟩ | the same as $R^a$ | 457 | 0.84 |
| 18 | —NHCO—⟨phenyl⟩—⟨cyclohexyl-H⟩—C₃H₇(n) (trans) | the same as $R^a$ | 455 | 0.84 |
| 19 | —NHCO—⟨cyclohexyl-H⟩ | the same as $R^a$ | 455 | 0.83 |
| 20 | —NHCO—⟨cyclohexyl-H⟩—C₄H₉(n) (trans) | the same as $R^a$ | 455 | 0.84 |
| 21 | 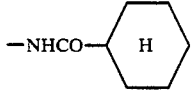 phthalimido | the same as $R^a$ | 448 | 0.83 |
| 22 | 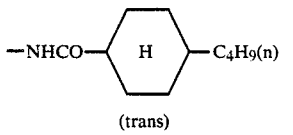 hexahydrophthalimido | the same as $R^a$ | 447 | 0.82 |
| 23 | 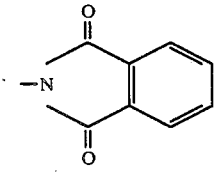 pyridine-dicarboximido | the same as $R^a$ | 448 | 0.82 |
| 24 | 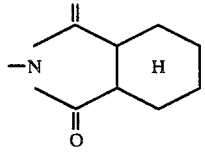 anthraquinone-dicarboximido | the same as $R^a$ | 448 | 0.82 |

TABLE 1-continued

[Structure: 1,5-bis(arylthio)anthraquinone with $R^a$ and $R^b$ substituents on phenyl rings]

| Example No. | $R^a$ | $R^b$ | Maximum Absorption Wavelength (nm) | Fdye |
|---|---|---|---|---|
| 25 | phthalimido-COOC$_4$H$_9$(n) | the same as $R^a$ | 447 | 0.83 |
| 26 | phthalimido-Cl | the same as $R^a$ | 447 | 0.80 |
| 27 | phthalimido-COO-C$_6$H$_4$-C$_4$H$_9$(n) | the same as $R^a$ | 447 | 0.83 |
| 28 | phthalimido-COO-C$_6$H$_4$-OC$_2$H$_5$ | the same as $R^a$ | 447 | 0.84 |
| 29 | phthalimido-CONHC$_6$H$_{13}$(n) | the same as $R^a$ | 446 | 0.81 |
| 30 | phthalimido-CONH-C$_6$H$_4$-C$_3$H$_7$(n) | the same as $R^a$ | 446 | 0.82 |
| 31 | phthalimido-CONH-C$_6$H$_4$-OC$_7$H$_{15}$(n) | the same as $R^a$ | 446 | 0.82 |

TABLE 1-continued

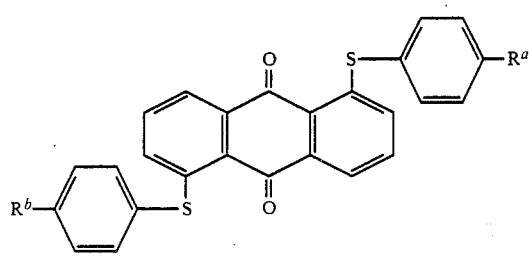

| Example No. | $R^a$ | $R^b$ | Maximum Absorption Wavelength (nm) | Fdye |
|---|---|---|---|---|
| 32 | —N(CO)₂C₆H₃-NHCOC₆H₁₃(n) | the same as $R^a$ | 447 | 0.82 |
| 33 | —N(CO)₂C₆H₃-NHCO-C₆H₄-C₄H₉(n) | the same as $R^a$ | 447 | 0.82 |
| 34 | —N(CO)₂C₆H₃-NHCO-C₆H₁₀(H)-C₅H₁₁(n) (trans) | the same as $R^a$ | 447 | 0.83 |

EXAMPLE 35

One gram of an anthraquinone compound of formula:

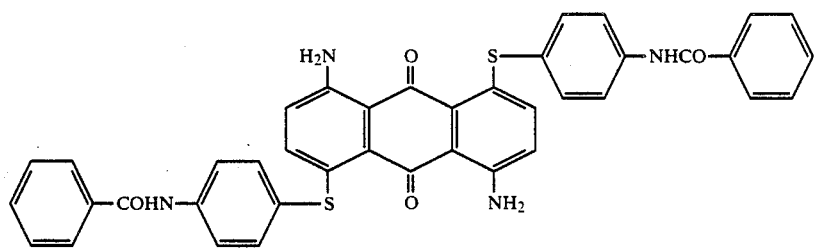

was melt-mixed with 1 Kg of a polyethylene naphthalate resin, and the mixture was molded into a film colored in distinct yellow.

The film was uniaxially stretched 5 times at 140° C. by means of a stretching machine manufactured by T. M. Long to obtain a yellow polarizing film having a thickness of 100 μm. The resulting polarizing film had maximum absorption wavelengths of 576 nm and 603 nm and a Fdye value of 0.83.

The anthaquinone compound used in this example was synthesized as follows.

Three grams of 1,5-diamino-4,8-bis(4'-aminophenyl-thio)anthraquinone were dissolved in 100 ml of N-methylpyrrolidone. To the solution was added 1.7 g of benzoyl chloride at 22° to 25° C., and 2 g of pyridine was further added thereto, followed by stirring at 22° to 25° C. for 4 hours. The reaction mixture was poured into 100 ml of methanol, and the precipitate formed was collected by filtration and dried to obtain 3.5 g of the desired compound having a melting point of 300° C. or higher.

EXAMPLE 36

One gram of an anthraquinone compound of formula:

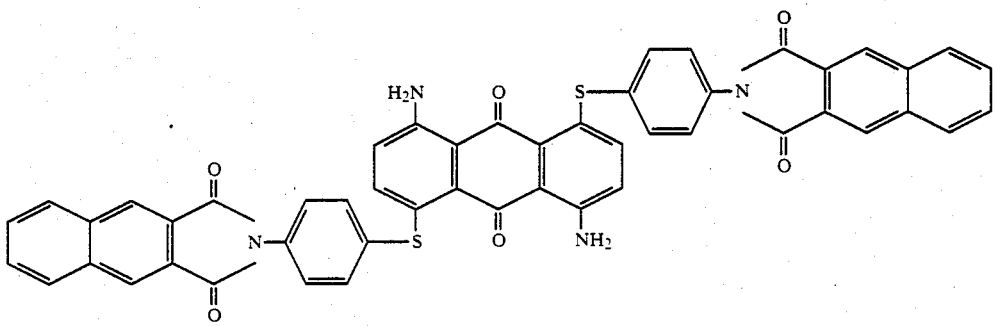

was melt-mixed with 1 Kg of a polyethylene naphthalate resin, and the mixture was molded into a film colored in distinct blue.

The film was uniaxially stretched 5 times at 140° C. by means of a stretching machine manufactured by T. M. Long to obtain a blue polarizing film having a thickness of 100 μm. The resulting polarizing film had maximum absorption wavelengths of 573 nm and 604 nm and an Fdye value of 0.75.

The anthraquinone compound used in this example was synthesized as follows.

A mixture consisting of 3.5 g of 1,5-diamino-4,8-bis(4'-aminophenylthio)anthraquinone, 2.9 g of naphthalene-2,3-dicarboxylic acid anhydride, and 400 ml of N,N-dimethylformamide was heated at 150° C. for 4 hours while stirring. After cooling, the precipitate was filtered, washed with methanol, and dried to obtain 4.0 g of the desired compound having a melting point of 300° C. or higher.

EXAMPLES 37 to 70

Anthraquinone compounds shown in Table 2 were prepared in the same manner as described in Example 35 or 36. A polarizing film was produced in the same manner as in Example 35, except for using each of the anthraquinone compounds of Table 2. The maximum absorption wavelength and Fdye value of the resulting polarizing film are also shown in Table 2.

TABLE 2

| Example No. | $R^a$ | $R^b$ | X | maximum absorption wavelength (nm) | Fdye |
|---|---|---|---|---|---|
| 35 | —NHCO—C₆H₅ | the same as $R^a$ | —NH₂ | 576, 603 | 0.83 |
| 36 | (naphthalimide group) | the same as $R^a$ | —NH₂ | 573, 604 | 0.75 |
| 37 | —NHCOC₄H₉(n) | the same as $R^a$ | —NH₂ | 573, 603 | 0.78 |
| 38 | —NHCOC₅H₁₁(n) | —NHCOCH₃ | —NH₂ | 573, 603 | 0.78 |
| 39 | —NHCOC₃H₇(n) | the same as $R^a$ | —H | 545 | 0.78 |
| 40 | —NHCO—C₆H₄—OC₆H₁₃(n) | the same as $R^a$ | —NH₂ | 576, 606 | 0.82 |

TABLE 2-continued

[Structure: anthraquinone with X at 1-position, SPh-R^a at 8-position, NH2 at 4-position, S-Ph-R^b at 5-position]

| Example No. | R^a | R^b | X | maximum absorption wavelength (nm) | Fdye |
|---|---|---|---|---|---|
| 41 | —CONH—⟨C6H4⟩—OCH3 | the same as R^a | —H | 544 | 0.79 |
| 42 | —NHCO—⟨C6H4⟩—⟨C6H5⟩ | the same as R^a | —NH2 | 574, 606 | 0.83 |
| 43 | —CONH—⟨2-pyridyl⟩ | the same as R^a | —NH2 | 573, 605 | 0.79 |
| 44 | —NHCO—⟨2-naphthyl⟩ | the same as R^a | —NH2 | 574, 605 | 0.82 |
| 45 | —NHCO—⟨anthraquinonyl⟩ | the same as R^a | —H | 545 | 0.75 |
| 46 | —NHCO—⟨C6H4⟩—NHCOCH3 | the same as R^a | —NH2 | 573, 605 | 0.80 |
| 47 | —NHCO—⟨C6H4⟩—C4H9(n) | the same as R^a | —NH2 | 573, 606 | 0.83 |
| 48 | —NHCO—⟨C6H4⟩—C3H7(n) | —H | —NH2 | 573, 605 | 0.63 |
| 49 | —CONH—⟨C6H4⟩—COC5H11(n) | the same as R^a | —NH2 | 572, 605 | 0.80 |
| 50 | —NHCO—⟨C6H4⟩—NHCO—⟨C6H5⟩ | the same as R^a | —NH2 | 573, 607 | 0.81 |

TABLE 2-continued

[Structure: anthraquinone core with X at one position, O groups, S-phenyl-R^a substituent, R^b-phenyl-S substituent, and NH₂ group]

| Example No. | R^a | R^b | X | maximum absorption wavelength (nm) | Fdye |
|---|---|---|---|---|---|
| 51 | —NHCO—⟨phenyl⟩—NHCO—⟨phenyl⟩—C₄H₉(n) | the same as R^a | —NH₂ | 574, 606 | 0.81 |
| 52 | —NHCO—⟨phenyl⟩—NHCO—⟨phenyl⟩—⟨phenyl⟩ | the same as R^a | —NH₂ | 574, 605 | 0.81 |
| 53 | —CONH—⟨phenyl⟩—⟨cyclohexyl-H⟩ | the same as R^a | —NH₂ | 573, 606 | 0.78 |
| 54 | —NHCO—⟨phenyl⟩—⟨cyclohexyl-H⟩—C₄H₉(n) (trans) | the same as R^a | —NH₂ | 573, 607 | 0.82 |
| 55 | —NHCO—⟨cyclohexyl-H⟩ | the same as R^a | —H | 544 | 0.76 |
| 56 | —NHCO—⟨cyclohexyl-H⟩—C₄H₉(n) (trans) | the same as R^a | —NH₂ | 574, 605 | 0.80 |
| 57 | —N(CO)₂-benzene (phthalimide) | the same as R^a | —NH₂ | 573, 604 | 0.74 |
| 58 | —N(CO)₂-cyclohexyl-H | the same as R^a | —NH₂ | 574, 604 | 0.74 |
| 59 | —N(CO)₂-pyridine | the same as R^a | —NH₂ | 573, 605 | 0.74 |

TABLE 2-continued
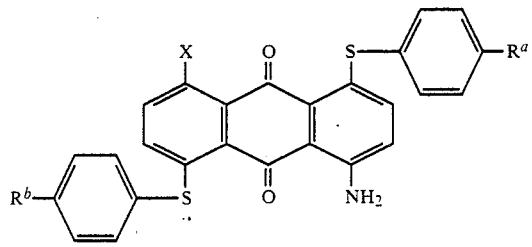
| Example No. | $R^a$ | $R^b$ | X | maximum absorption wavelength (nm) | Fdye |
|---|---|---|---|---|---|
| 60 | 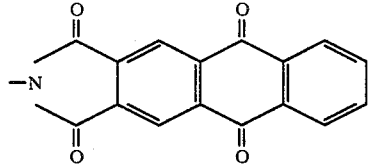 | the same as $R^a$ | $-NH_2$ | 573<br>604 | 0.75 |
| 61 | 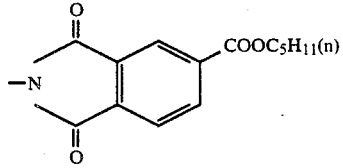 | the same as $R^a$ | $-NH_2$ | 574<br>604 | 0.74 |
| 62 | 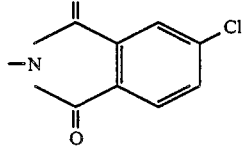 | the same as $R^a$ | $-NH_2$ | 574<br>603 | 0.72 |
| 63 | 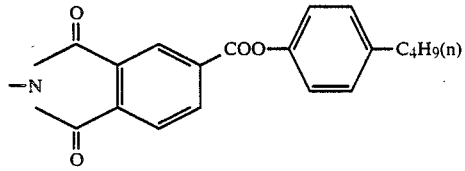 | the same as $R^a$ | $-NH_2$ | 573<br>603 | 0.76 |
| 64 | 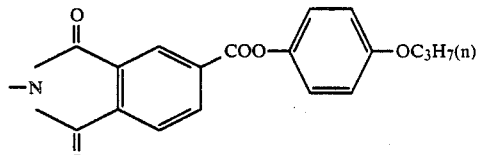 | the same as $R^a$ | $-NH_2$ | 574<br>605 | 0.76 |
| 65 | 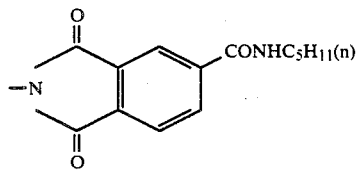 | the same as $R^a$ | $-NH_2$ | 574<br>603 | 0.74 |
| 66 | 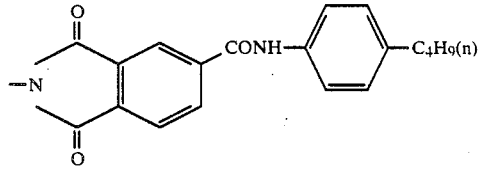 | the same as $R^a$ | $-NH_2$ | 573<br>604 | 0.76 |

TABLE 2-continued

Structure:
Anthraquinone core with X at position 5, S-C6H4-R^a at position 1, R^b-C6H4-S at position 4, NH2 at position 8.

| Example No. | R^a | R^b | X | maximum absorption wavelength (nm) | Fdye |
|---|---|---|---|---|---|
| 67 | phthalimido-C6H3(CONH-C6H4-OC5H11(n)) | the same as R^a | —NH2 | 574, 604 | 0.76 |
| 68 | phthalimido-C6H3(NHCOC6H13(n)) | the same as R^a | —H | 544 | 0.73 |
| 69 | phthalimido-C6H3(NHCO-cyclohexyl(trans)-C4H9(n)) | the same as R^a | —NH2 | 574, 604 | 0.75 |
| 70 | phthalimido-C6H3(NHCO-C6H4-C2H5) | the same as R^a | —NH2 | 573, 604 | 0.75 |

Since the anthraquinone compounds according to the present invention exhibit satisfactory compatibility with organic polymers to be used as film base materials as well as high dichroism, the polarizing films produced from these compounds are excellent in all respects required, i.e., polarizing performance, heat resistance, moisture resistance, weather resistance, and transparency.

While the invention has been described in detail and with reference to specific embodiments thereof, it will be apparent to one skilled in the art that various changes and modifications can be made therein without departing from the spirit and scope thereof.

What is claimed is:

1. An anthraquinone compound represented by formula:

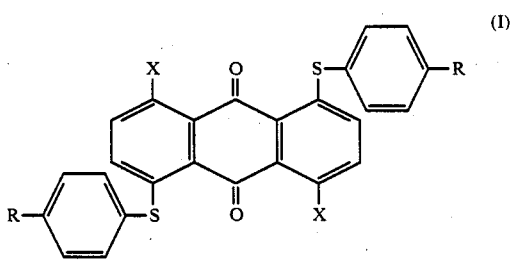

(I)

wherein two R, which may be the same or different, each represents a hydrogen atom, —NHCOR$^1$, or —CONHR$^1$, wherein R$^1$ represents an alkyl group, a substituted or unsubstituted aryl group, or a substituted cycloalkyl group; and two X, which may be the same or different, each represents a hydrogen atom or an amino group, provided that X and R are not simultaneously a hydrogen atom.

2. An anthraquinone compound as claimed in claim 1, wherein R$^1$ represents a straight chain or branched alkyl group having from 1 to 8 carbon atoms, a phenyl group, a phenyl group substituted with an alkyl group having from 1 to 8 carbon atoms, a phenyl group substituted with an alkoxy group having from 1 to 8 carbon atoms, a biphenyl group, a heterocyclic group, a naphthyl group, an anthraquinon-2-yl group, an alkylcarbonylamino-substituted phenyl group, an arylcarbonylamino-substituted phenyl group, a 4-cyclohexylphenyl group, a cyclohexylphenyl group substituted with a trans-4-alkyl group having from 1 to 8 carbon atoms, a cyclohexyl group, a cyclohexyl group substituted with a trans-4-alkyl group having from 1 to 8 carbon atoms, or a 4-cyclohexylcyclohexyl group.

3. The compound of claim 2 wherein R' represents a straight chain or alkyl group having from 1 to 8 carbon atoms.

* * * * *